Patented Oct. 16, 1951

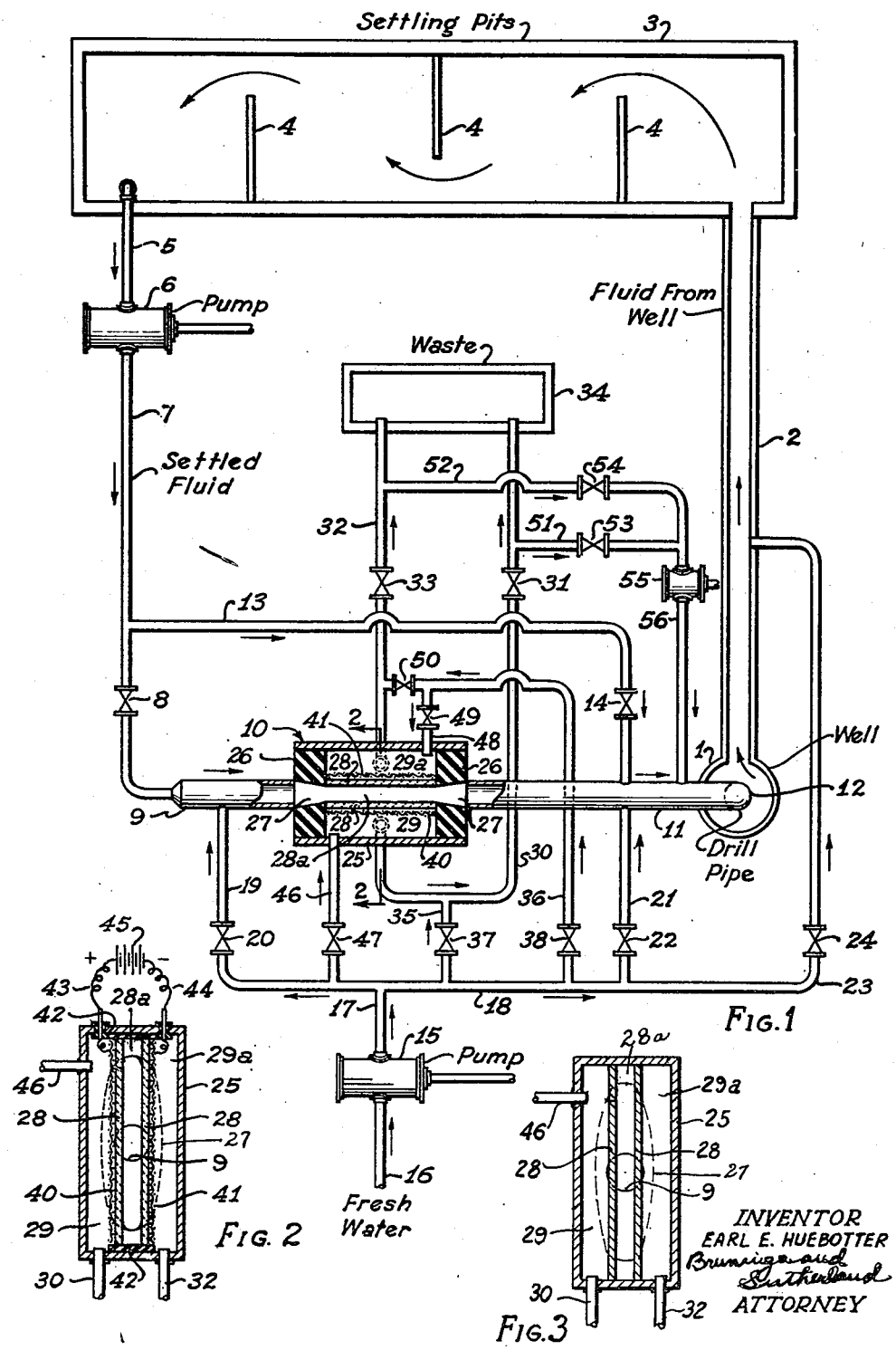

2,571,247

UNITED STATES PATENT OFFICE 2,571,247

ELECTRODIALYTIC TREATMENT OF WELL-DRILLING FLUIDS

Earl E. Huebotter, Los Angeles, Calif., assignor to National Lead Company, Los Angeles, Calif., a corporation of New Jersey Application September 6, 1943, Serial No. 501,395

10 Claims. (Cl. 204—180)

1

This invention relates to the treatment of well drilling fluids. This application is a continuation-in-part of application, Serial No. 286,860, filed July 27, 1939 (now abandoned), as to subject matter common to the applications.

In the drilling of wells, such as oil or gas wells, more particularly by the rotary method of drilling, a drilling fluid or mud is forced down a drill pipe, issues through eyes in the bit, rises outside of the drill pipe, and then passes to a settling ditch and a sump from which it is taken for recirculation. The drilling fluid, which is ordinarily of the consistency of heavy lubricating oil, is usually made up of clay and water; frequently, however, mud-weighting materials, such as barytes and iron oxide, emulsoid colloids, such as bentonite, starch, gums, etc., are employed, as are also viscosity reducing agents, such as polyphosphates. The drilling fluid will, therefore, contain a gel component and a non-gel component.

During the course of drilling through formations, the drilling fluid becomes contaminated with cuttings, including salts and water from the formation, and this water may be salt water. Some of these salts affect the viscosity of the fluid, while such salts as sodium chloride, calcium chloride and magnesium chloride may cause flocculation of the fluid so as to affect its desirable properties, including its wall sealing properties.

One of the objects of this invention, therefore, is to provide a process of treating a contaminated drilling fluid in order to recondition it or to improve its properties.

Another object is to provide an apparatus capable of performing such treatment.

Further objects will appear from the detail description in which will be set forth a number of embodiments of this invention. It is to be understood, however, that this invention is susceptible of various embodiments within the scope of the appended claims.

In the drawings Figure 1 is a flow plan of an apparatus for practicing this invention and showing in section a treating device for practicing this invention; Figure 2 is a section on line 2—2, Figure 1; Figure 3 is a view similar to Figure 2 but showing another embodiment of this invention.

Generally stated, and in accordance with illustrative embodiments of this invention, a drilling fluid containing a gel component is subjected to dialysis, and more particularly to electro-dialysis, to remove ions therefrom, particularly the ions acquired from a formation by contact of the drilling fluid with the formation. Where the consistency, such as the viscosity, gel strength yield, or colloidal character or other properties of the fluid have been altered, dialysis may be resorted to to restore the consistency. After subjecting the drilling fluid to dialysis, ions may be added to the drilling fluid or water free from ions may be added.

Referring to the drawings, the numeral 1 represents a well being drilled by conventional rotary methods and through which a drilling fluid is circulated. A conduit 2 leads from well 1 to one end of a series of gravity settling pits 3 provided with baffles 4, where well cuttings are separated from the drilling fluid and entrained gas released therefrom. Instead of gravity settling pits 3, mechanical shakers, screens, separators, or similar devices well known in the art, may be used to separate cuttings and gas from the drilling fluid. From the opposite end of settling pits 3, a suction pipe 5 leads to a mud pump 6, having a discharge pipe 7, in which is mounted a valve 8, and which connects to an inlet nozzle 9, which is, in turn, connected to the inlet of a dialysis cell, designated generally by the numeral 10, to be described in greater detail hereinafter. From the outlet of cell 10 a pipe 11 leads to the inlet of the conventional hollow drill pipe 12, with the usual swivel, and which drill pipe extends downwardly in well 1 to the bottom thereof and is provided at its lower end with a conventional drill bit, not shown, having the conventional openings or "eyes" which provide discharge ports from the interior of the drill pipe 12 to the annular space between the drill pipe and the wall of well 1. A by-pass pipe 13, fitted with a valve 14, leads from a point in pipe 7 between pump 6 and valve 8 around cell 10 and connects into pipe 11 between cell 10 and drill pipe 12. A pump 15 is connected by a pipe 16 to a source of supply of fresh water, not shown, and has a discharge pipe 17, which connects into a header 18, from which a branch pipe 21, having a valve 22, leads into pipe 11, a branch pipe 19, having a valve 20 leads into nozzle 9, and a branch pipe 23, having a valve 24, leads into conduit 2 between well 1 and settling pits 3.

A dialysis cell may be of the simple form, as shown in Figure 3, or may be of the electrodialysis form, as shown in Figure 2 and also in Figure 1. These cells operate on the principle of dialysis or osmosis. The function is generally to remove dissolved salts from the drilling fluid leaving the colloids or gel forming constituents and the insoluble non-gel forming constituents, In both embodiments, a dialysis cell 10 consists of a housing 25, preferably constructed of metal of sufficient strength to withstand internal pressures of the order of 200 to 1000 lbs. per square inch or more. Housing 25 is provided with end closure members 26—26 which are provided with narrow, vertically elongated openings 27—27 converging inwardly toward each other. One of the openings is connected to nozzle 9 and the other to the end of pipe 11 which connects to cell 10. A pair of semi-permeable diaphragms 28—28, arranged in parallel and narrowly spaced apart to form a passagewy 28a therebetween, are positioned vertically within housing 25 and extend lengthwise thereof between the end pieces 26—26. The adjacent inner faces of diaphragms 28—28 register at each end with the corresponding side edges of the corresponding opening 27. The top, bottom and side edges of diaphragms 28 are closely fitted within housing 25 and end members 26 so as to form a fluid tight connection therewith even under high pressure. The outer faces of diaphragms 28—28 are spaced from the adjacent side walls of housing 25 to form a pair of chambers 29—29a which are also adapted to receive filtrate passing through the diaphragms when such filtration occurs. The top, bottom and outer side walls of chambers 29 and 29a are formed by housing 25, the inner side walls by the diaphragms 28 and end walls by end members 26.

In both embodiments pipe 30, having a valve 31, communicates with chamber 29 through the bottom thereof, and a pipe 32, having a valve 33 communicates similarly with chamber 29a. Pipes 30 and 32 discharge into a waste pit 34. Branch pipes 35 and 36 fitted, respectively, with valves 37 and 38, lead from header 18 and connect to pipes 30 and 32, respectively. An additional branch pipe 46, fitted with a valve 47 leads from header 18 into the upper portion of chamber 29 near one end thereof, and another branch pipe 48, fitted with a valve 49, leads from branch pipe 36 into the upper portion of chamber 29a near the end thereof opposite that at which branch pipe 46 enters chamber 29. A valve 50 is interposed in the portion of branch pipe 36 extending between pipe 32 and branch pipe 48. Pipes 51 and 52, fitted with valves 53 and 54, respectively, lead from respective pipes 30 and 32 and connect to the suction of a pump 55 which has a discharge pipe 56 connecting into pipe 11 between cell 10 and drill pipe 12.

In Figure 1, the end members 26 are constructed of electrically non-conducting materials such as hard-rubber, an artificial resin or the like; and a pair of electrodes 40—41, preferably constructed of metal screen of good electrical conductivity and having good resistance to acid and alkali corrosion, are positioned in the respective chambers 29 and 29a parallel to the corresponding diaphragms 28 and closely adjacent thereto, and are electrically insulated at their top and bottom edges from housing 25 by means of insulation strips 42—42 constructed of any suitable non-conducting material. The electrodes 40—41 are connected by respective leads 43—44 to positive and negative poles respectively, of a battery 45 which may, of course, be supplanted by any other suitable source of direct current. Thus electrode 40 becomes the anode and chamber 29 the anode chamber, while electrode 41 becomes the cathode and chamber 29a the cathode chamber of the electro-dialysis cell.

The cross sectional area of passageway 28a may be varied depending upon the viscosity and composition of the fluid to be treated, tne pressure employed, and the volume of fluid to be treated, but in every case is such as to provide a relatively high velocity flow of the fluid across the faces of diaphragms 28—28 forming the opposite sides of passageway 28a.

The diaphragms 28—28 may be constructed of any suitable semi-permeable material suitable for dialysis membranes, but are preferably constructed of rigid solids such as porcelain, Alundum or special form of Carborundum, of suitable semi-permeable character adapted for dialysis work. These diaphragms are preferably of such a character that some filtration of the liquid phase of the fluids being treated may also take place during dialysis, as it is ordinarily desirable that a positive flow of liquid be maintained through the diaphragms to aid the dialytic movement therethrough of the ions of the electrolytes being removed from the fluids.

As noted above, in Figure 2, the electrodes 40—41 are preferably constructed of metal screen or other perforate material having good electrical conductivity and having good resistance to alkali and acid corrosion. Special carbon electrodes may be used or the cathode may be of iron or lead, which are resistant to alkali corrosion, while the anode, which is ordinarily subject to acid corrosion may be constructed of platinum or other resistant material of good electrical conductivity.

When a fluid containing water having salts dissolved therein and containing also gel forming and non-gel forming solid constituents is passed through passageway 28a of the dialysis cell, as shown in Figures 1, 2 and 3, particularly when fresh water is maintained in the chambers 29 and 29a outside of the diaphragms, the dissolved salts will pass through the diaphragms into the chambers and are carried off to the waste 34; all in accordance with the principle of dialysis or osmosis. Where electric potentials are applied to the outside faces of the diaphragm, alkali metal ions move to the cathode while acid ions move to the anode. In either case the solids and gel constituents will be left behind but will be passed through the passageway 28a by the force of the current. The gel forming constituents which may have a tendency to become deposited on the walls of the passageway 28a will also be scoured off.

The described apparatus is employed in the following manner in practicing the method of this invention when applied particularly to the treatment of well drilling fluids.

As noted above, drilling fluid is pumped into well 1 through the interior of drill pipe 12 to the bottom of the well where it is discharged through the drill bit openings and picks up the well cuttings removed by the bit and carries them through the annular space between the drill pipe and the wall of the well bore to the surface of the ground, where the cuttings-laden fluid is discharged through conduit 2 into pits 3. Also as previously noted, drilling fluids commonly employed in rotary drilling comprise suspensions of clay substances in water, and in some cases, include relatively high specific gravity weighting materials and bentonite. When freshly prepared, and in the absence of certain contaminating substances which may be encountered, such suspensions are fairly permanet, and are able to drop out the cuttings and release any entrained gas quite satisfactorily when allowed to flow through the settling pits 3, without effecting any material change in the relative proportions of liquid to solid phase of the original fluid, and without substantial change in consistency, such as, the viscosity, gel strength, yield strength, colloidal character or other desirable properties of the fluid. However, when the drill encounters sub-surface formations, containing, for example, salt, saline water which generally contains, among other things, sodium, magnesium and calcium chloride, sulfates and carbonates, or when the drill is cutting out cement which had been previously placed in the well, these various substances, when encountered, produce detrimental and marked changes in the viscosity, gel strength, yield strength, and colloidal character generally of the fluid.

The contaminated drilling fluid, carrying the solid cuttings is discharged from the well 1 and flows through conduit 2 into settling pits 3 where the heavy cuttings separate from the fluid by gravity settling and the separated fluid, containing the contaminated liquid phase, is drawn through suction pipe 5 by pump 6, which pumps the contaminated fluid through pipe 7 and nozzle 9 into and through dialysis cell 10, where it passes through passageway 28a to pipe 11 and thence back to the well through the interior of drill pipe 12. The fluid is forced through passageway 28a of the dialysis cell at relatively high pressure and at high velocity which produces a scouring action of the fluid on the adjacent faces of diaphragms 28—28 such as to continuously scour these faces clean of any solid matter tending to deposit thereon. Also at the same time, chambers 29 and 29a are kept filled with a moving current of water supplied from header 18 through respective branch pipes 46 and 48, and discharged from the electrode chambers through pipes 30 and 32 respectively. In this manner, the diaphragms 28—28 are maintained between contaminated fluid containing dissolved electrolytes on one side and fresh water on the other.

In the embodiment of Figure 3 the dissolved salts will pass from 28a through the diaphragms and to the chambers 29 and 29a and will be carried off to the waste 34. In the embodiment of Figure 2 when the current is applied to the electrodes 41 and 40, electro-dialysis will then take place through the diaphragms, the alkali metal ions in the contaminated fluid moving through one of the diaphragms 28 to the cathode 41 and into the cathode chamber 29a, and the acid ions to the anode 40 and into anode chamber 29. The movement of the fresh water through the electrode chambers prevents undue concentration of acid and alkali in the respective chambers.

By suitable control of volume and velocity of fluid being treated, and in case of Fig. 2 by control also of the electric current, the dialysis of the contaminated fluid passing through the cell 10 via passageway 28a may be controlled to effect removal from the fluid of controlled amounts of the contaminating electrolytes or ions and thus restore the fluid to its original pH value and enable it to retain its desired properties for use in well 1.

By proper selection of the diaphragm material, as to its porosity and permeability characteristics, and by control of the pressure differential across diaphragms 28—28 by suitable manipulation of valves 31 and 33, a controlled amount of filtration of the drilling fluid may take place during dialysis, with the result that a positive flow of liquid phase of the fluid through the diaphragm will take place and will thereby aid the movements of the ions through the diaphragms. The filtration step may also be employed where it is desired to reduce the proportion of liquid phase in the drilling fluid in cases where the drilling fluid has been diluted by liquids encountered in the well. By this combination of dialysis and filtration, the drilling fluid may thus be restored to both its original liquid-solid composition and to its original pH value. It will be understood that the high velocity flow of the drilling fluid through passageway 28a will act to continuously remove any of the solid phase of the fluid tending to deposit on the faces of the diaphragms and thereby retain these solids in the drilling fluid.

Deleterious ionic concentrations in the drilling fluid may also result from the introduction therein during drilling of solid substances having deleterious cations or anions absorbed on the particles thereof. Certain clays, shales, and bentonites, for example, which are commonly referred to as non-swelling clays, shales or bentonites, are often encountered. Such materials, while they do not ionize to any appreciable extent in solution in the drilling fluid, nevertheless, if allowed to remain in the drilling fluid will produce undesirable effects therein similar in nature to those produced by excessive concentrations of alkali or acid ions. When fluids containing such materials are subjected to dialysis, the deleterious ions are released and may be removed by the dialysis. After removal of the deleterious ions, they may be replaced in the fluid by ions having the same electrical sign but which are not deleterious to the fluid. For example, assume a calcium bentonite present in the drilling fluid. The fluid is subjected to electro-dialysis as above described and the divalent calcium ions removed. These are then replaced by adding to the dialyzed fluid monovalent sodium ions in the form of, for example, sodium hydroxide or sodium carbonate. The latter may be added by introduction through pipe 21 and valve 22, being fed through pump 15 or from some other suitable source. If the deleterious ions are anions, such as sulfate ions, they may be replaced, after removal by electro-dialysis, with phosphate ions in the form, for example, of sodium-hexa-metaphosphate or mono-sodium-acid-phosphate.

The pH of a fluid may be varied by the addition of acid ions. In such case, the acid ions, instead of being washed from anode chamber 29 are returned to the stream of drilling fluid by forcing the anode chamber fluid back through its enclosing diaphragm 28 into the stream of fluid passing through passageway 28a. This may be accomplished by closing valve 33 in pipe 32, and valve 49 in pipe 48 and by opening valves 39 and 50 in pipe 36. Fresh water from header 18 will then flow into chamber 29a through pipe 32 and thence through diaphragm 28 into passageway 28a, and will carry with it the acid ions entering chamber 29a under the influence of the dialytic current. A similar operation may be conducted in connection with the fluid in cathode chamber 29 in case it is desired to increase more rapidly the pH value of the fluid. In this case, the alkali ions are returned to the fluid by forcing the cathode chamber fluid through diaphragm 28 into the drilling fluid in passageway 28a. Of course, in both these cases, the diaphragms 28 should be of a material having sufficient permeability to allow movement of the fluids therethrough.

Instead of forcing the liquid containing ions from either chamber 29 or 29a, as may be desired, through the diaphragms and into the stream of fluid in passageway 28a, the ion-containing liquid may be withdrawn from the respective chambers 29 and 29a by means of pump 55 through pipes 30 and 32 and thence by way of pipes 51 and 52, and discharged into pipe 11 thus returning the ion-containing liquid to the stream of fluid flowing to the well. This arrangement may be employed particularly where the diaphragms are of relatively low permeability so that it would be difficult to force the liquid from the electrode chambers back through the diaphragms. By suitable manipulation of valves 53 and 54 the removed ions may be selectively returned to the drilling fluid, and in any desired proportion.

In many cases, it will be unnecessary to treat the entire drilling fluid by the methods above described, as it will be found that by treating only a portion of the fluid, the pH value may be progressively altered as desired. In such cases, by suitable manipulation of valve 14 in pipe 13 and valve 8 in pipe 7, any desired portion of the drilling fluid may be passed through cell 10 for treatment by any of the modifications above described, while the remainder will be by-passed around cell 10 through pipe 13 into pipe 11.

Where filtration is employed in conjunction with dialysis as above described, and such filtration would tend to reduce the proportion of liquid phase in the drilling fluid below a desired proportion, the quantity of liquid phase removed from the drilling fluid may be replaced with fresh water by opening valve 22 in pipe 21 and introducing the desired quantity of fresh water from header 18. Or it may be desired to pre-dilute the contaminated drilling fluid before dialysis and filtration, in which case fresh water is added to the drilling fluid through pipe 19 and valve 20, the excess thus added being subsequently removed by filtration in cell 10, as described.

In still another case, the fluid passing from well 1 may have become greatly thickened by addition of certain solids or contaminating substances encountered in the well, so that the fluid will not readily release cuttings and entrained gas in pits 3. In such a case, fresh water may be added from pipe 23 to the fluid flowing through conduit 2 to thin the fluid to the extent necessary to cause satisfactory settling of cuttings and separation of entrained gas in pit 3. The excess liquid thus added may then be removed in cell 10 by filtration during the dialysis treatment.

Where semi-permeable membranes are used in connection with the filtration step, they may become clogged in the course of operation. In such a case, the treating operation may be stopped long enough to back wash the diaphragms by closing valves 31, 33, 47 and 49, and valves 37, 38 and 50 opened, whereby fresh water from header 18 will flow into chambers 29 and 29a. This reverse flow will serve to clear the diaphragms of clogging material.

It will be understood that a plurality of dialysis cells may be used either in series or in parallel as desired, and any or all of them may employ diaphragms which permit of filtration as described. Or the dialysis and filtration operations may be conducted in separate cells, one after the other, if desired.

The amount of electric current to be employed in the electro-dialysis operation is variable, being determined largely by the concentration of undesirable ions to be removed, the rate at which removal shall take place, the quantity and rate of flow of fluid through the dialysis cells, etc.

The area of passageway 28a is determined generally by the volume of fluid to be treated and the rate of treatment desired, but is ordinarily such that the fluid will flow therethrough at high velocity under the pressure applied by pump 6.

The pressure maintained in the stream of fluid passing through cell 10 is ordinarily relatively high in order to provide high velocity flow. Where filtration is employed in conjunction with dialysis, any desired differential pressure across the diaphragms 28—28 in the direction of chambers 29 and 29a may be maintained by suitable manipulation of valves 31 and 33. Where it is desired to effect reverse flow from either of chambers 29 or 29a into passageway 28a, water under a pressure higher than that in passageway 28a will be supplied by pump 15 through header 18 and thence either through pipes 35 and 36 or through pipes 46 and 48 to the respective chambers 29 and 29a.

Numerous modifications and alterations may be made in the process steps and in the details of the apparatus herein described within the scope of the appended claims and without departing from the spirit of this invention. Furthermore, subcombinations may be employed and are of utility.

Having thus described the invention, what is claimed is:

1. In the treatment of gel-containing well drilling fluids consisting of a suspension of clay solids in water containing ions of electrolytes therein, the method of altering the pH value of such a fluid which comprises, flowing said fluid in a restricted stream through a treating zone wherein said fluid is confined between dialytic diaphragms, subjecting said fluid while in passage through said zone to electro-dialysis to thereby cause movement of said ions through said diaphragms and out of said fluid, and maintaining sufficient velocity in said stream to continuously remove from the adjacent faces of said diaphragms by erosive action of said stream the solids depositing thereon to thereby retain said solids in said fluid.

2. In the treatment of gel-containing well drilling fluids consisting of a suspension of clay solids in water containing ions of electrolytes therein, the method of altering the pH value of such a fluid which comprises, flowing said fluid in a restricted stream through a treating zone wherein said fluid is confined between dialytic diaphragms, subjecting said fluid while in passage through said zone to electro-dialysis to thereby cause movement of said ions through said diaphragms and out of said fluid, maintaining sufficient velocity in said stream to continuously remove from the adjacent faces of said diaphragms by erosive action of said stream the solids depositing thereon to thereby retain said solids in said fluid, and selectively returning solution of removed ions to said fluid.

3. In a method according to claim 2, wherein the removed ions selectively returned to said fluid are the negative ions.

4. The method of treating gel-containing well drilling muds contaminated by added electrolytes to restore said mud to substantially its original composition which comprises, subjecting said mud to simultaneous electro-dialysis and filtration to thereby remove from said mud the deleterious ions of said electrolytes together with a portion of the contaminated liquid phase of said mud, and thereafter adding to said mud a quantity of uncontaminated liquid phase sufficient to replace that removed by said filtration.

5. The method of controlling the pH value of a gel-containing well drilling mud containing electrolytes in solution which comprises, subjecting said mud to electro-dialysis to remove therefrom both the positive and negative ions of said electrolytes, and selectively returning to said mud only one of said ions.

6. The method of reducing the pH value of a gel-containing well drilling mud containing electrolytes in solution which comprises, subjecting said mud to electro-dialysis to remove therefrom both the positive and negative ions of said electrolytes, and returning to said mud only said negative ions.

7. The method of treating gel-containing well drilling muds containing undesirable ions which comprises, subjecting a flowing stream of said mud to electro-dialysis to effect removal therefrom of said undesirable ions, and replacing the removed ions by addition to said mud of other desirable ions of the same electric sign.

8. The method of treating gel-containing well drilling fluids consisting of a suspension of clay solids in water containing ions of electrolytes therein which comprises, flowing said fluid in a restricted stream through the middle compartment of a three-compartment dialysis cell wherein said fluid is confined between semi-permeable dialytic diaphragms and passing electric current between electrodes placed in the external compartments of said cell, in order to subject said fluid while in passage through said middle compartment to electro-dialysis to thereby cause movement of said ions through said diaphragms and out of said fluid, applying sufficient pressure to said fluid in said middle compartment to force liquid phase of said fluid through said diaphragms and out of said fluid, maintaining sufficient velocity in said stream to continuously remove from adjacent faces of said diaphragms by errosive action of said stream the solids depositing thereon to thereby retain said solids in said fluid, and adding to the treated fluid fresh liquid phase to replace said liquid phase removed in said middle compartment.

9. In the drilling of wells wherein a gel-containing drilling fluid comprising a suspension of clay solids in water is circulated through the drilling zone of a well wherein solid cuttings and contaminated electrolytes are added to said fluid, the method of restoring said fluid to substantially its original character which comprises, flowing the fluid leaving the well to a separating zone, therein separating solid cuttings from said fluid, passing the separated fluid containing said electrolytes in a restricted stream through the middle compartment of a three-compartment dialysis cell wherein said stream is confined between dialytic diaphragms and passing electric current between electrodes placed in the external compartments of said cell, in order to subject said fluid while in passage through said middle compartment to electro-dialysis to thereby cause movement of the ions of said electrolytes through said diaphragms and out of said fluid, maintaining sufficient velocity in said stream to continuously remove from the adjacent faces of said diaphragms by erosive action of said stream the clay solids depositing thereon to thereby retain said solids in said fluid, and returning the fluid leaving said middle compartment to said well.

10. A method accordng to claim 9 wherein a portion of the solution of the removed ions is returned to said fluid.

EARL E. HUEBOTTER.

REFERENCES CITED

The following references are of record in the file of this patent:

UNITED STATES PATENTS

| Number | Name | Date |
| --- | --- | --- |
| 1,603,298 | Speed | Oct. 19, 1926 |
| 2,218,533 | Huebotter | Oct. 22, 1940 |
| 2,219,312 | Hayward et al. | Oct. 29, 1940 |

OTHER REFERENCES

"Physics," May 1932, pages 365–375.

"Technical Association of the Pulp and Paper Industry," vol. 20 (1937), page 361.

"Kolloid Beihefte," vol. 36 (1932), pages 43–46.

"Oil and Gas Journal," Oct. 16, 1930, pages 95, 113.

"Petroleum Times," Mar. 3, 1934, page 225.